May 20, 1941.  G. M. DEMING  2,242,291
GAS STORAGE CYLINDER CONNECTION
Filed May 25, 1939
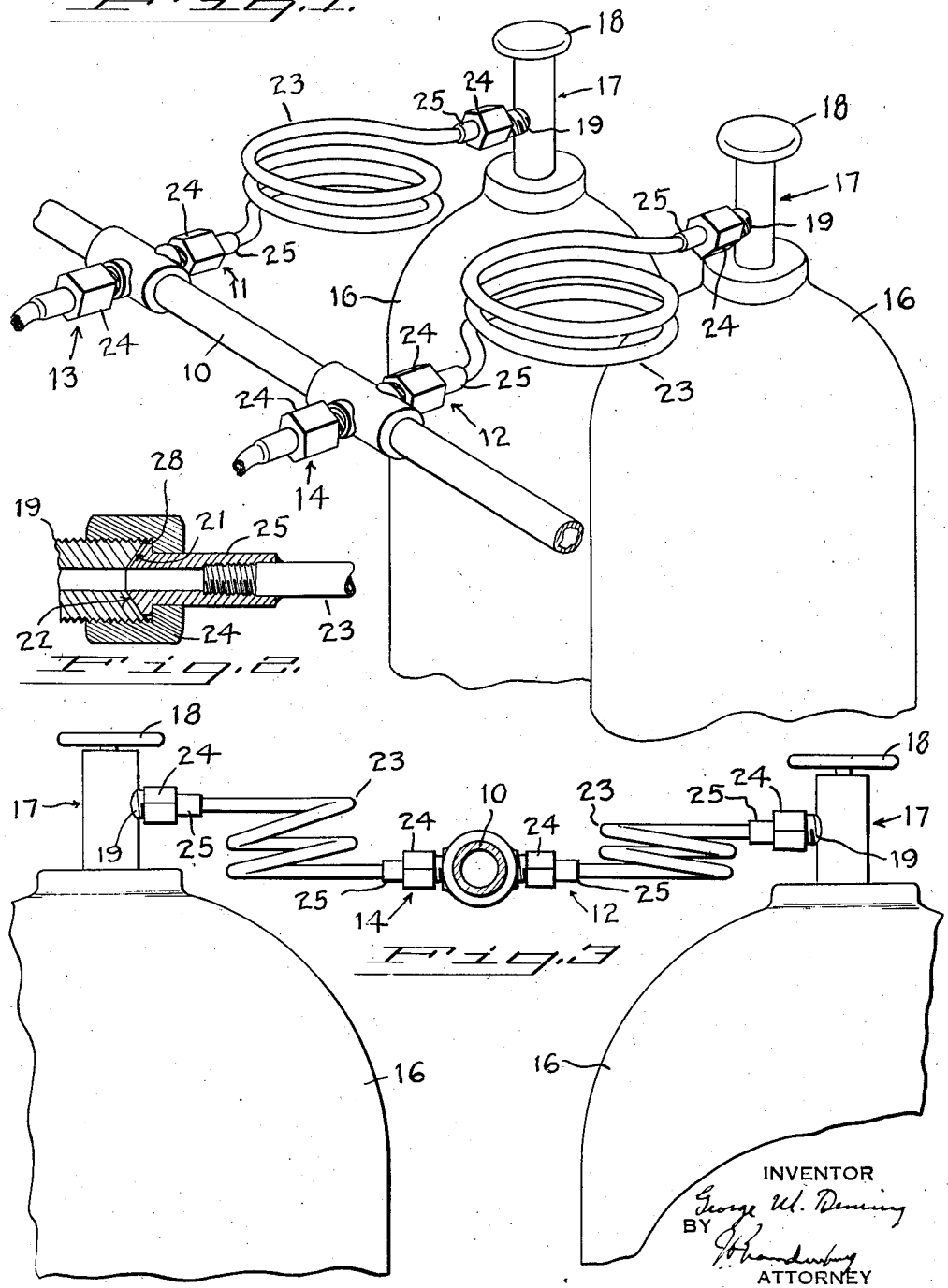
INVENTOR
George M. Deming
BY
ATTORNEY Patented May 20, 1941

2,242,291

UNITED STATES PATENT OFFICE 2,242,291

GAS STORAGE CYLINDER CONNECTION

George M. Deming, East Orange, N. J., assignor to Air Reduction Company, Incorporated, New York, N. Y., a corporation of New York Application May 25, 1939, Serial No. 275,579

3 Claims. (Cl. 285—8)

This invention relates to the connecting of gas storage cylinders with supply lines, distributing manifolds, or other piping to which it is necessary to connect new cylinders from time to time.

The commercial storage cylinders in which high-pressure gas, especially oxygen, is sold, are very heavy. Because of their great weight they are usually handled by tilting the cylinder and rolling it along its bottom edge while tilted. Where numbers of these cylinders are used, they can be handled most conveniently if they are connected with the piping while in an upright position and kept in an upright position while in use. Manifolds for the cylinders are commonly supported at a level approximating that of the storage cylinder valves when the cylinders are standing upright on the floor.

The cylinders are connected with the manifold by copper tubing which is usually looped in a vertical plane to impart increased flexibility to the connector. Such a connector is known as a "pigtail" and it has a gland at each end with an end face which may be flat but is usually frustro-conical or frustro-spherical. Clamping nuts on the connector secure each end face of the connector against an end face of the manifold branch or the cylinder valve outlet.

It is an object of this invention to provide improved connecting means joining a gas storage cylinder with a manifold or other pipe or apparatus to which gas is to be supplied. Another object is to provide connecting means by which gas storage cylinders and supply piping can be connected and disconnected more easily and quickly.

There is a variation in the heights of commercial storage cylinders and a manifold branch located at exactly the same height as the valve of one gas storage cylinder may be slightly above or below the valve of the next cylinder to be connected to that branch when the first cylinder is removed for refilling.

The end face of the connector tube must not only be brought to the new level, but it must be alined with the threaded end of the valve before the clamping nut can be screwed onto the valve. It is a feature of the construction of this invention that the end portion of the connector and the clamping nut can be alined with the outlet of a storage cylinder valve without making any permanent bends in the tubing of the connector.

Another feature of the invention is that a mechanic can "feel" the connector into alinement with the valve while turning the clamping nut to start it on the threads of the valve outlet, in contrast with the "bend and try" procedure of the prior art.

Other objects, features and advantages of the invention will appear or be pointed out as the specification proceeds.

In the accompanying drawing, forming a part hereof:

Fig. 1 is a fragmentary perspective view showing two gas storage cylinders connected to a manifold by connecting means embodying this invention.

Fig. 2 is an enlarged sectional view showing the manner in which the tube of a connector is clamped to the outlet of a cylinder valve.

Fig. 3 is a view illustrating the operation of the invention with storage cylinders of different height located on opposite sides of the manifold.

A manifold 10 is shown with take-off pipes or branches 11 and 12 extending to the right and other branches 13 and 14 extending to the left. There may be any number of additional branches beyond the short section of the manifold shown in the drawing.

A gas storage cylinder 16 has a valve 17 screwed into its upper end. The valve 17 is opened and closed by a handle 18, and has an outlet 19 through which gas flows when the valve is open.

The outlet 19 has a frustro-conical end face 21 (Fig. 2), and there is a complementary frustro-conical end face 22 on the connector 23 which is clamped against the end of the outlet 19 by a clamping nut 24.

There is a short, straight tubular end section 25 at each end of the connector 23. This section 25 is of somewhat larger diameter than the intermediate portion of the connector, and the tubing of the intermediate portion is threaded into the end section 25 and then soldered to make a strong and gas-tight connection.

The clamping nut 24 has a threaded bore that fits the threads of the valve outlet 19, and a shoulder 28 at the end of the threaded bore bears against a shoulder on the connector and holds the end face of the connector tightly against the end face of the valve outlet 19. The connector 23 is preferably joined to the manifold by a connection similar to that which joins it to the valve outlet 19 of the storage cylinder.

Beyond the shoulder 28 the bore through the clamping nut is of reduced diameter slightly greater than the diameter of the straight end section 25 of the connector 23. The nut 24 is, therefore, a sliding fit on the straight section 25 and has only a very limited angular movement transverse of the axis of the straight section.

Because of this limited movement, the clamping nut 24 cannot be brought sufficiently close to alinement with the valve outlet 19 to engage the threads of the valve outlet except when the straight end portion of the connector is substantially in axial alinement with outlet 19 of the valve.

A clamping nut similar to the nut 24 but loose enough on the connector 23 to engage the threads on the valve outlet 19 without requiring the alinement of the connector and valve outlet would not be satisfactory because the nut might clamp the end faces of the connector and valve outlet together with uneven pressure around their circumference and a leak would result.

The intermediate portion of the connector 23 is made of resilient tubing, preferably semi-hard drawn brass, silicon copper alloy, such as "Everdur," or other high-strength copper alloy, and is formed into a cylindrical spiral or helix having a substantially vertical or upwardly extending axis and a pitch substantially greater than the diameter of the tubing so that the convolutions of the spiral are spaced from one another.

The manifold 10 is located above the floor or other supporting surface on which the storage cylinders stand. The height of the manifold 10 is less than that of the valve or cylinder outlet 19 by an amount which is substantially equal to the offset between the two ends of the helix of the connector 23. There is, however, a variation in the length of commercial gas storage cylinders, and a manifold branch that registers exactly with the valve outlet of one cylinder may be too high or too low for the valve outlet of the next cylinder which is connected to that branch after the first cylinder is taken away to be refilled.

With the spaced convolutions about an upwardly extending axis, the end portion 25 of the connector 23 can be moved in a direction parallel to the axis of the cylindrical spiral and into alinement with the valve outlet 19. It is a feature of the invention that for tubing of a given resilience there are enough convolutions in the spiral to permit the necessary vertical movement of the end portion 25 without stressing the tubing beyond its elastic limit. In the case of gas storage cylinders such as used for oxygen, an allowance of approximately three inches is made for variation in the height of the valve outlets 19.

With a given height of manifold, the connector 23 is preferably formed so that when in its normal position the end portion 25 remote from the manifold is horizontal and at a height approximately one-third of the way from the upper and two-thirds of the way from the lower end of the range of positions which it occupies when connected with the storage cylinders.

When a new cylinder is rolled into position to be connected with the manifold 10, the projecting end face of the free end portion 25 can be pushed into the recessed end face of the valve outlet 19, and the free end portion brought into alinement with the valve outlet 19 by pressing that part of the top convolution which is furthest away from the valve outlet, either up or down until the free end portion 25 comes into alinement.

The axes of the valve outlet 19 and end portion 25 can be originally put in the same vertical plane by the positioning of the cylinder 16 with respect to the normal position of the connector 23. Since the free end portion 25 is horizontal in its normal position, as previously explained, pressure on the convolutions can be made to move the free end of the connector up and down while maintaining it substantially horizontal. Such a shifting of the end of the tubing to various parallel levels puts it into position for register or alinement with cylinder outlets at different heights, but the horizontal position of the end portion can be disturbed while moving to a different height and then reestablished by the same pressure on the convolutions required to produce a parallel shifting.

If the top convolution of the connector has to be moved out of normal position in order to obtain horizontal alinement of the end portion 25 with the valve outlet 19, the connector tends to spring back into normal position because not stressed beyond its elastic limit. It is therefore possible for a mechanic to "feel" the end portion into alinement with the valve outlet by varying his hand pressure on the far side of the upper convolution while continuously turning the clamping nut 24 with his other hand in a manner that causes the nut to engage the threads of the valve outlet 19 as soon as the end portion 25 of the connector comes into alinement with the valve outlet 19.

After the clamping nut 24 is screwed on the valve outlet 19, the connector 23 will be held with whatever distortion of the spiral is necessary to obtain the alinement with the valve outlet. Fig. 3 shows cylinders of different heights on the opposite sides of the manifold, and the distortion of the pitch of the spiral portions of the connectors 23 is shown clearly.

This invention has been described in connection with a manifold to which gas is supplied by the cylinders, but the invention can be applied to manifolds for refilling storage cylinders, or to any connection to or from which gas is supplied at different times with different cylinders. Various changes and modifications can be made in the illustrated embodiment of the invention, and some features can be used without others.

I claim:

1. Connector means for facilitating the connection of a fixed take-off pipe with gas storage cylinders of various heights, said means including tubing forming a substantially cylindrical spiral having a plurality of convolutions and arranged with the axis of the convolutions extending substantially vertically and the convolutions spaced apart whereby pressure on the convolutions adjusts a free end of the tubing up and down while maintaining said free end substantially horizontal.

2. Connector means for facilitating the connection of a fixed take-off pipe with gas storage cylinders of various heights, said means including tubing forming a substantially cylindrical spiral having a plurality of convolutions with the space between convolutions at least as great as the diameter of the tubing and the tubing constructed of resilient material so that when the connector means is positioned with the axis of the spiral substantially vertical and with one end of the connector means held in a fixed position, the other end can be moved up or down without change of alinement by applying pressure to the convolutions to move them closer together.

3. The combination with a fixed take-off connection, of means for successively connecting gas storage cylinders of different height with said take-off connection, said means including tubing forming a spiral having a plurality of convolutions spaced apart lengthwise of the axis of the spiral, one end of the tubing being connected to the fixed take-off with the axis of the spiral substantially vertical so that the other end of the tubing, when not connected with a cylinder, can be shifted up and down to various parallel levels for register with cylinder outlets at different heights.

GEORGE M. DEMING.